United States Patent
Kim et al.

(10) Patent No.: US 10,986,468 B2
(45) Date of Patent: Apr. 20, 2021

(54) METHOD AND DEVICE FOR DETERMINING MBMS SERVICE OF INTEREST TO TERMINAL

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/778,900

(22) PCT Filed: Nov. 22, 2016

(86) PCT No.: PCT/KR2016/013464
§ 371 (c)(1),
(2) Date: May 24, 2018

(87) PCT Pub. No.: WO2017/090953
PCT Pub. Date: Jun. 1, 2017

(65) Prior Publication Data
US 2018/0352387 A1 Dec. 6, 2018

Related U.S. Application Data

(60) Provisional application No. 62/260,255, filed on Nov. 26, 2015.

(51) Int. Cl.
*H04W 4/06* (2009.01)
*H04W 48/12* (2009.01)
(Continued)

(52) U.S. Cl.
CPC ............ *H04W 4/06* (2013.01); *H04J 11/0073* (2013.01); *H04W 48/10* (2013.01); *H04W 48/12* (2013.01); *H04W 72/005* (2013.01)

(58) Field of Classification Search
CPC ....... H04W 4/06; H04W 48/10; H04W 48/08; H04W 72/005; H04J 11/0073
See application file for complete search history.

(56) References Cited

U.S. PATENT DOCUMENTS

2010/0157873 A1 6/2010 Yi et al.
2012/0236776 A1* 9/2012 Zhang ............... H04W 36/0007
370/312

(Continued)

FOREIGN PATENT DOCUMENTS

WO WO 2015/060608 A1 4/2015

OTHER PUBLICATIONS

Fujishiro; Masato, "Base Station and User Terminal" U.S. Appl. No. 62/145,897, filed Apr. 10, 2015 (Year: 2015).*

(Continued)

*Primary Examiner* — Thinh D Tran
(74) *Attorney, Agent, or Firm* — Birch, Stewart, Kolasch & Birch, LLP

(57) ABSTRACT

Provided are a method for determining an MBMS service in which a terminal has interest in a wireless communication system, and a device supporting same. The terminal may include acquiring an SIB15 and determining whether an MBMS SAI (service area identity) for a certain MBMS service in a USD (User Service Description) is included in the SIB15, and determining the certain MBMS service to be an MBMS service of interest.

6 Claims, 11 Drawing Sheets

(51) Int. Cl.
*H04J 11/00* (2006.01)
*H04W 48/10* (2009.01)
*H04W 72/00* (2009.01)

(56) References Cited

U.S. PATENT DOCUMENTS

| | | | | |
|---|---|---|---|---|
| 2013/0083715 A1* | 4/2013 | Etemad | | H04W 52/04 370/312 |
| 2013/0242738 A1 | 9/2013 | Chang | | |
| 2014/0036676 A1* | 2/2014 | Purnadi | | H04W 76/40 370/235 |
| 2014/0169255 A1* | 6/2014 | Zhang | | H04W 72/005 370/312 |
| 2015/0023243 A1* | 1/2015 | Liu | | H04L 51/38 370/312 |
| 2015/0049600 A1* | 2/2015 | Balasubramanian | | H04W 76/40 370/216 |
| 2015/0063193 A1* | 3/2015 | Veerepalli | | H04W 48/00 370/312 |
| 2015/0381378 A1* | 12/2015 | Zhang | | H04W 72/005 370/312 |
| 2016/0014571 A1* | 1/2016 | Lee | | H04W 4/06 370/312 |
| 2016/0135099 A1* | 5/2016 | Werner | | H04W 4/06 370/329 |
| 2017/0078931 A1* | 3/2017 | Yoshizawa | | H04W 36/0069 |
| 2018/0014232 A1* | 1/2018 | Hoehne | | H04W 36/04 |
| 2018/0035340 A1* | 2/2018 | Fujishiro | | H04W 36/08 |

OTHER PUBLICATIONS

N. Nguyen and C. Bonnet, "Service continuity for eMBMS in LTE/LTE—Advanced network: Standard analysis and supplement," 2014 IEEE 11th Consumer Communications and Networking Conference (CCNC), Las Vegas, NV, 2014, pp. 219-224, doi: 10.1109/CCNC.2014.6866574. (Year: 2014).*

Nokia Networks, "Signalling TMGIs in MBMSInterestIndication message", R2-156753, 3GPP TSG-RAN WG2 Meeting #92, Anaheim, USA, Nov. 16-20, 2015, (http://www.3gpp.org/ftp/tsg_ran/WG2RL2/TSGR2_92/Docs/R2-156753.zip), See section 3.6.

* cited by examiner

FIG. 3
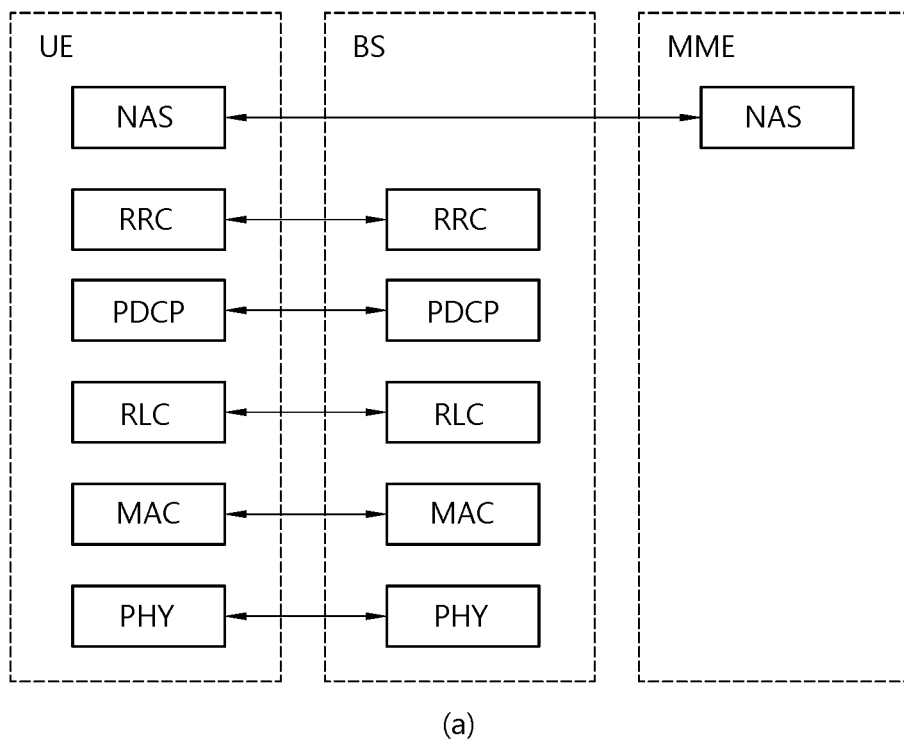
(a)
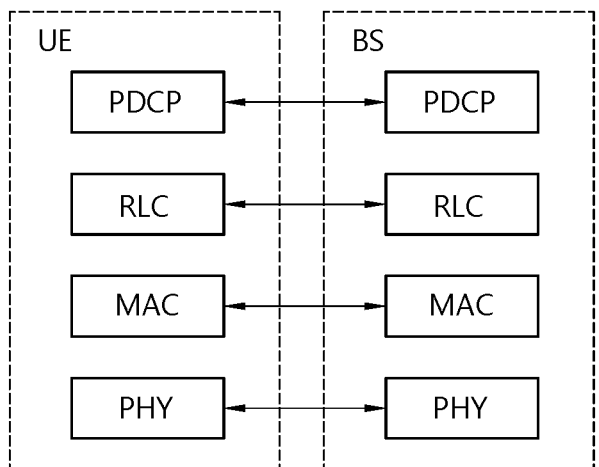
(b)

METHOD AND DEVICE FOR DETERMINING MBMS SERVICE OF INTEREST TO TERMINAL

CROSS REFERENCE TO RELATED APPLICATIONS

This application is the National Phase of PCT International Application No. PCT/KR2016/013464, filed on Nov. 22, 2016, which claims priority under 35 U.S.C. 119(e) to U.S. Provisional Application No. 61/260,255, filed on Nov. 26, 2015, all of which are hereby expressly incorporated by reference into the present application.

BACKGROUND OF THE INVENTION

Field of the Invention

The present invention relates to a wireless communication system, and more particularly, to a method of determining an MBMS service of interest by a user equipment (UE), and an apparatus supporting the method.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A Multimedia Broadcast/Multicast Service (MBMS) is a service of simultaneously transmitting a data packet to a plurality of users, similar to an existing Cell Broadcast Service (CBS). However, the CBS is a low-speed message-based service, while the MBMS is designed for high-speed multimedia data transmission. Further, the CBS is not Internet Protocol (IP)-based, whereas the MBMS is based on IP multicast. According to the MBMS, when users of a certain level are present in the same cell, the users are allowed to receive the same multimedia data using a shared resource (or channel), and thus the efficiency of radio resources may be improved and the users may use a multimedia service at low costs.

The MBMS uses a shared channel so that a plurality of UEs efficiently receives data on one service. A BS allocates only one shared channel for data on one service, instead of allocating as many dedicated channels as the number of UEs to receive the service in one cell. The plurality of UEs simultaneously receives the shared channel, thus improving the efficiency of radio resources. Regarding the MBMS, a UE may receive the MBMS after receiving system information on the cell.

An important communication technique such as public safety or group communication system enablers for LTE (GCSE_LTE) has been introduced in Rel-12. In Rel-12 GCSE, group communication has been designated as eMBMS. The eMBMS is designed to supply media content to a pre-planned wide area (i.e., an MBSFN area). The MBSFN area is rather static (e.g., configured by O&M), and cannot be dynamically adjusted according to user distribution. Even if all radio resources of a frequency domain are not used, eMBMS transmission may occupy a full system bandwidth, and multiplexing with unicast is not allowed in the same subframe. An MBSFN subframe configuration is also rather static (e.g., configured by O&M). That is, an MBSFN subframe cannot be dynamically adjusted according to the number of dynamic groups and a traffic load of a dynamic group. Therefore, when providing an importance communication service, a radio resource configuration for the eMBMS may be unnecessarily wasted. Therefore, single-cell point-to-multipoint (SCPTM) transmission is proposed for an effective use of the radio resource. While identifiable signals are transmitted simultaneously in a plurality of cells in the MBSFN transmission, the MBMS service is transmitted in a single cell in the SCPTM transmission.

SUMMARY OF THE INVENTION

When there is no change in an MBMS frequency and MBMS service of interest and there is a change in a service area for the MBMS service of interest, an MBMS interest indication message is not transmitted. However, even if there is a change in the service area for the MBMS service of interest, it may be necessary to transmit the MBMS interest indication message. Therefore, there is a need to propose a method of transmitting the MBMS interest indication message by a UE.

An embodiment provides a method of determining a multimedia broadcast/multicast service (MBMS) service of interest by a UE in a wireless communication system. The UE may acquire a SystemInformationBlockType15 (SIB15), determine whether an MBMS service area identity (SAI) for a specific service in a user service description (USD) is included in the SIB15, and determine the specific MBMS service to be the MBMS service of interest.

If the MBMS SAI for the specific MBMS service in the USD is included in the SIB15, the specific MBMS service may be determined to be the MBMS service of interest. The UE may check whether a set of the determined MBMS services of interest is different from MBMS-services included in last transmission of an MBMS interest indication message. If the set of the determined MBMS services of interest is different from the MBMS-services, the UE may initiate transmission of the MBMS interest indication message including the set of the determined MBMS services of interest.

The SIB15 may be acquired from a primary cell (PCell). The PCell may be a serving cell.

One or more MBMS SAIs may exist in the USD.

The SIB15 may include an MBMS SAI.

The UE may be receiving the specific MBMS service via a single cell MBMS point to multipoint radio bearer (SC-MRB).

The UE may be interested in receiving the specific MBMS service via the SC-MRB.

A session of the specific MBMS service may be ongoing.

The specific MBMS service may be provided at a frequency belonging to a set of MBMS frequencies of interest.

Another embodiment provides a UE for determining an MBMS of interest in a wireless communication system. UE may include: a memory; a transceiver; and a processor for coupling the memory and the transceiver. The processor may be configured to: control the transceiver to acquire an SIB15; determine whether an MBMS SAI for a specific service in a USD is included in the SIB15; and determine the specific MBMS service to be the MBMS service of interest.

If the MBMS SAI for the specific MBMS service in the USD is included in the SIB15, the specific MBMS service may be determined to be the MBMS service of interest.

The processor may be configured to check whether a set of the determined MBMS services of interest is different from MBMS-services included in last transmission of an MBMS interest indication message.

Although there is no change in an MBMS frequency of interest and an MBMS service of interest, an MBMS interest indication message can be transmitted.

BRIEF DESCRIPTION OF THE DRAWINGS

FIG. 3 shows a control plane and a user plane of a radio interface protocol of an LTE system.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
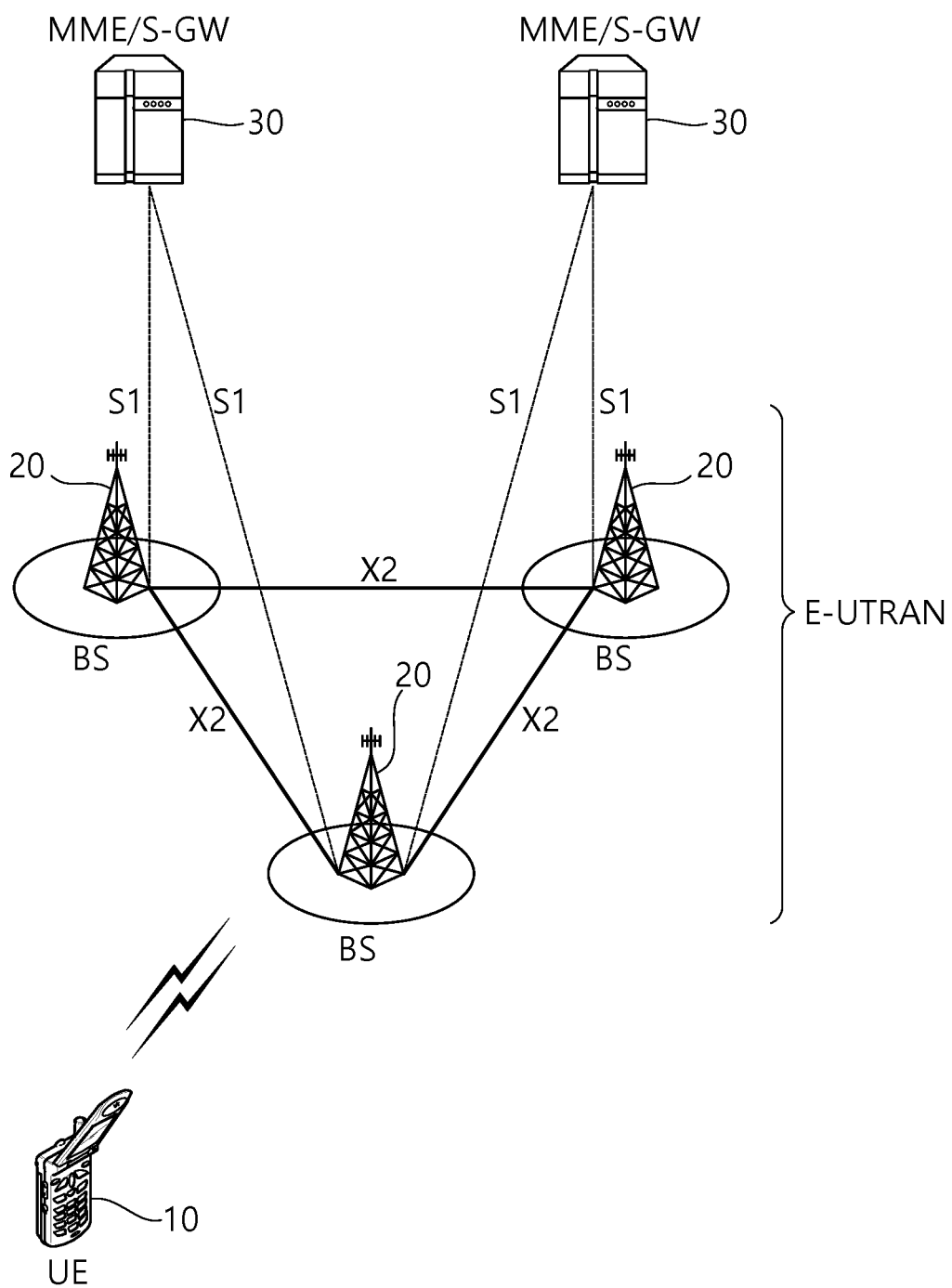
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
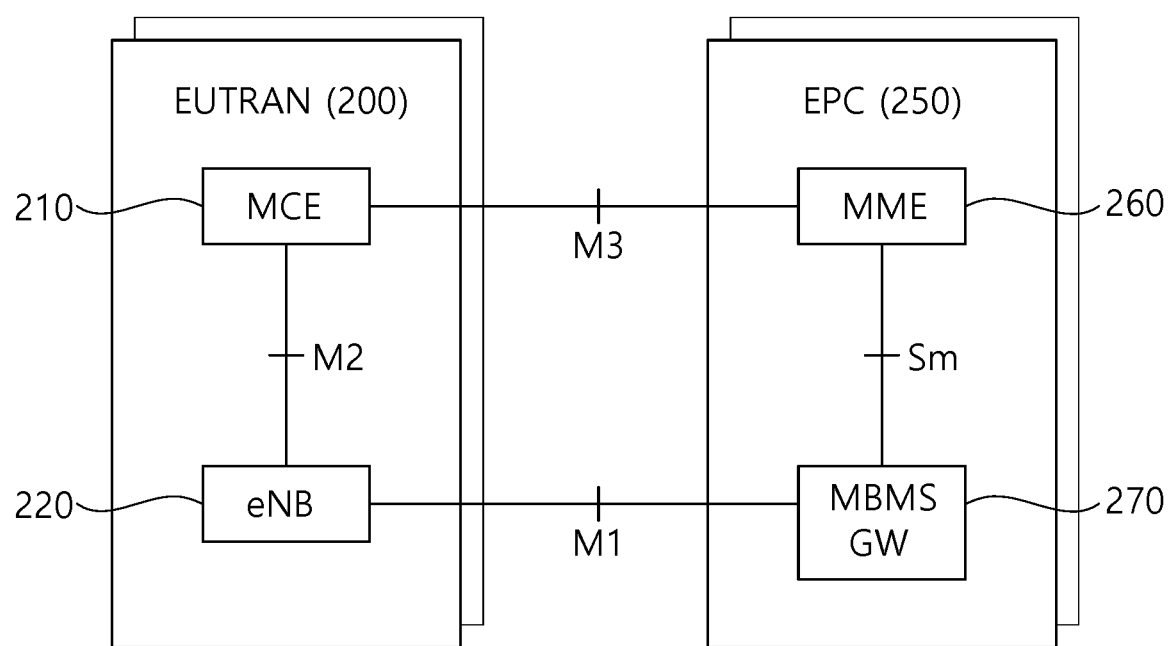
FIG. 2 shows a network architecture for an MBMS.

FIG. 2 shows a network architecture for a Multimedia Broadcast/Multicast Service (MBMS).

Referring to FIG. 2, the radio access network (EUTRAN, 200) includes a multi-cell coordination entity (hereinafter, "MCE", 210) and a base station (eNB, 220). The MCE 210 is a main entity for controlling the MBMS and plays a role to perform session management, radio resource allocation or admission control of the base station 220. The MCE 210 may be implemented in the base station 220 or may be implemented independent from the base station 220. The interface between the MCE 210 and the base station 220 is called M2 interface. The M2 interface is an internal control plane interface of the radio access network 200 and MBMS control information is transmitted through the M2 interface. In case the MCE 210 is implemented in the base station 220, the M2 interface may be present only logically.

The EPC (Evolved Packet Core, 250) includes an MME 260 and an MBMS gateway (GW) 270. The MBMS gateway 270 is an entity for transmitting MBMS service data and is positioned between the base station 220 and the BM-SC and performs MBMS packet transmission and broadcast to the base station 220. The MBMS gateway 270 uses a PDCP and IP multicast to transmit user data to the base station 220 and performs session control signaling for the radio access network 200.

The interface between the MME 260 and the MCE 210 is a control plane interface between the radio access network 200 and the EPC 250 and is called M3 interface. Control information related to MBMS session control is transmitted through the M3 interface. The MME 260 and the MCE 210 transmits, to the base station 220, session control signaling such as a session start/stop message for session start or session stop, and the base station 220 may inform the UE through a cell notification that the corresponding MBMS service has been started or stopped.

The interface between the base station 220 and the MBMS gateway 270 is a user plane interface and is called M1 interface.

FIG. 3 shows a control plane and a user plane of a radio interface protocol of an LTE system. FIG. 3(*a*) shows a control plane of a radio interface protocol of an LTE system. FIG. 3(*b*) shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 3(a), the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3(b), the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and RRC Connection Procedure are Described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, an MBMS and a Multicast/Broadcast Single Frequency Network (MBSFN) are Described.

MBSFN transmission or MBSFN-mode transmission refers to a simultaneous transmission scheme in which a plurality of cells transmits the same signal at the same time. MBSFN transmissions from a plurality of cells within an MBSFN area are perceived as a single transmission for a UE.

The MBMS service may be managed or localized in a cell-based or geography-based manner. An area in which a specific MBMS service is provided is widely referred to as an MBMS service area. For example, if an area in which a specific MBSMS service A proceeds is an MBMS service area A, a network in the MBMS service area A may be in a state of transmitting the MBMS service A. In this case, the UE may receive the MBMS service A according to a UE capability. The MBMS service area may be defined in terms of an application and a service as to whether a specific service is provided in a specific area.

A transport channel for the MBMS, that is, a multicast channel (MCH), may be mapped to a logical channel, e.g., a multicast control channel (MCCH) or a multicast traffic channel (MTCH). The MCCH transmits an MBMS-related RRC message, and the MTCH transmits a traffic of a specific MBMS service. One MCCH exists in every one MBMS single frequency network (MBSFN) region for transmitting the same MBMS information/traffic. The MCCH includes one MBSFN region configuration RRC message, and has a list of all MBMS services. If the MBMS-related RRC message is changed in a specific MCCH, a physical downlink control channel (PDCCH) transmits an MBMS radio network temporary identity (M-RNTI) and an indication for indicating the specific MCCH. The UE which supports the MBMS may receive the M-RNTI and the MCCH indication through the PDCCH, may recognize that the MBMS-related RRC message is changed in the specific MCCH, and may receive the specific MCCH. The RRC message of the MCCH may be changed in every modification period, and is broadcast repetitively in every repetition period. A notification mechanism is used to inform an MCCH change caused by a presence of an MCCH session start or MBMS counting request message. The UE detects the MCCH change informed without having to depend on the notification mechanism through MCCH monitoring in the modification period. The MTCH is a logical channel on which an MBMS service carried. If many services are provided in an MBSFN region, a plurality of MTCHs may be configured.

A UE may also be provided with a dedicated service while being provided with an MBMS service. For example, a user may chat on the user's own smartphone using an instant messaging (IM) service, such as MSN or Skype, simultaneously with watching a TV on the smartphone through an MBMS service. In this case, the MBMS service is provided through an MTCH received by a plurality of UEs at the same time, while a service provided for each individual UE, such as the IM service, is provided through a dedicated bearer, such as a dedicated control channel (DCCH) or dedicated traffic channel (DTCH).

In one area, a BS may use a plurality of frequencies at the same time. In this case, in order to efficiently use radio resources, a network may select one of the frequencies to provide an MBMS service only in the frequency and may provide a dedicated bearer for each UE in all frequencies. In this case, when a UE, which has been provided with a service using a dedicated bearer in a frequency where no MBMS service is provided, wishes to be provided with an MBMS service, the UE needs to be handed over to an MBMS providing frequency. To this end, the UE transmits an MBMS interest indication to a BS. That is, when the UE wishes to receive an MBMS service, the UE transmits an MBMS interest indication to the BS. When the BS receives the indication, the BS recognizes that the UE wishes to receive the MBMS service and hands the UE over to an MBMS providing frequency. Here, the MBMS interest indication is information indicating that the UE wishes to receive an MBMS service, which additionally includes information on a frequency to which the UE wishes to be handed over.

The UE, which wishes to receive a specific MBMS service, first identifies information on a frequency at which the specific service is provided and information on broadcast time at which the specific service is provided. When the MBMS service is already on air or is about to be on air, the UE assigns a highest priority to the frequency at which the MBMS service is provided. The UE performs a cell reselection procedure using reset frequency priority information and moves to a cell providing the MBMS service to receive the MBMS service.

When the UE is receiving an MBMS service or is interested in receiving an MBMS service and when the UE is allowed to receive an MBMS service while camping on an MBMS service-providing frequency, it may be considered that the frequency is assigned a highest priority during an MBMS session as long as the following situations last while the reselected cell is broadcasting SIB13.

When SIB15 of a serving cell indicates that one or more MBMS service area identities (SAIs) are included in the user service description (USD) of the service.

SIB15 is not broadcast in a serving cell, and the frequency is included in the USD of the service.

A UE needs to be able to receive an MBMS in RRC_IDLE and RRC_CONNECTED states.

Figure 4:
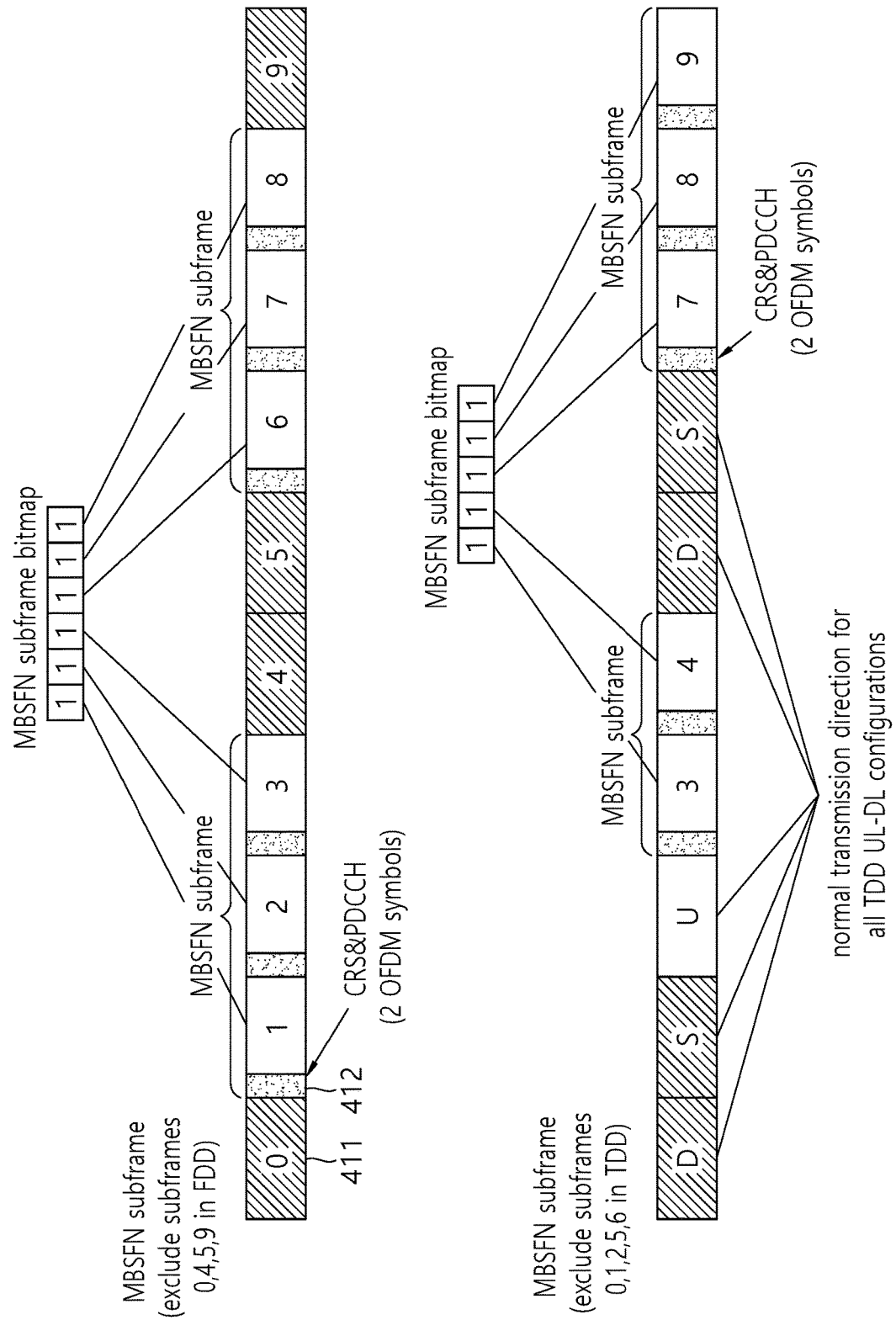
FIG. 4 shows a structure of an MBSFN subframe.

FIG. 4 shows a structure of an MBSFN subframe.

Referring to FIG. 4, MBSFN transmission is configured by the subframe. A subframe configured to perform MBSFN transmission is referred to as an MBSFN subframe. In a subframe configured as an MBSFN subframe, MBSFN transmission is performed in OFDM symbols other than first two OFDM symbols for PDCH transmission. For convenience, a region used for MBSFN transmission is defined as an MBSFN region. In the MBSFN region, no CRS for unicast is transmitted but an MBMS-dedicated RS common to all cells participating in transmission is used.

In order to notify even a UE receiving no MBMS that no CRS is transmitted in the MBSFN region, system information on a cell is broadcast including configuration information on the MBSSFN subframe. Since most UEs perform radio resource management (RRM), radio link failure (RLF) processing, and synchronization using a CRS, it is important to indicate the absence of a CRS in a specific region. A CRS is transmitted in first two OFDM symbols used as a PDCCH in the MBSFN subframe, and this CRS is not for an MBSFN. A CP of the CRS transmitted in the first two OFDM symbols used as the PDCCH in the MBSFN subframe (that is, whether the CRS uses a normal CP or an extended CP) follows a CP applied to a normal subframe, that is, a subframe which is not an MBSFN subframe. For example, when a normal subframe 411 uses a normal CP, a CRS according to the normal CP is also used in the first two OFDM symbols 412 of the MBSFN subframe.

Meanwhile, a subframe to be configured as an MBSFN subframe is designated by FDD and TDD, and a bitmap is used to indicate whether a subframe is an MBSFN subframe. That is, when a bit corresponding to a specific subframe in a bitmap is 1, it is indicated that the specific subframe is configured as an MBSFN subframe.

Figure 5:
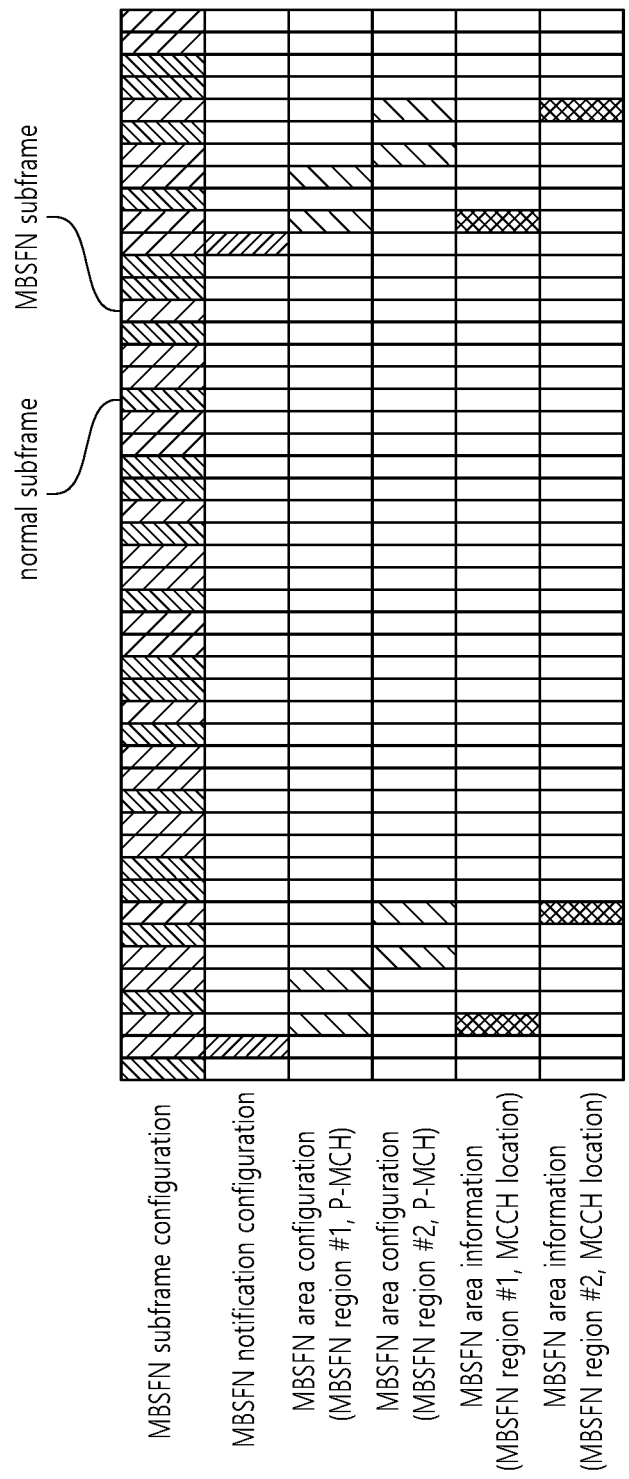
FIG. 5 shows an example of an MBSFN subframe configuration for performing an MBMS service.

FIG. 5 shows an example of an MBSFN subframe configuration for performing an MBMS service.

Referring to FIG. 5, a UE acquires MBSFN subframe configuration information, MBSFN notification configuration information, and MBSFN area information list to perform the MBMS service.

The UE may know the MBSFN subframe configuration information, that is, a position of an MBSFN subframe, through SIB2 and RRC dedicated signaling. For example, the MBSFN subframe configuration information may be included in an MBSFN-SubframeConfig information element (IE).

In addition, the UE may acquire the MBSFN area information list and the MBMS notification configuration information as information required to acquire MBMS control information related to one or more MBSFN regions in which the MBMS service can be performed through SIB13. Herein, for each MBSFN region, the MBSFN area information list may include an MBSFN region ID, information regarding an MBSFN region in an MBSFN subframe in a corresponding MBSFN region, information such as an MBSFN subframe position at which transmission of an MCCH occurs as an MBMS control information channel, or the like. For example, the MBSFN area information list may be included in an MBSFN-AreaInfoList information element. Meanwhile, the MBSFN notification configuration information is configuration information for a subframe position at which an MBMS notification occurs to inform that there is a change in the MBSFN region configuration information. For example, the MBSFN notification configuration information may be included in an MBMS-NotificationConfig information element. The MBSFN notification configuration information includes time information utilized to notify an MCCH change applicable to all MBSFN regions. For example, the time information may include a notification repetition coefficient (notificationRepetitionCoeff), a notification offset (notificationOffset), and a notification subframe index (notificationSF-Index). Herein, the notification repetition coefficient implies a common notification repetition period for all MCCHs. The notification offset indicates an offset of a radio frame in which the MCCH change notification information is scheduled. In addition, the notification subframe index is a subframe index used to transmit an MCCH change notification on a PDCCH.

The UE may acquire the MBSFN region configuration information through an MCCH corresponding to each of the MBSFN regions acquired through SIB13. The MBSFN region configuration information may be included in an MBSFNAreaconfiguration message, and contains information regarding physical multicast channels (PMCHs) used in a corresponding MBSFN region. For example, information regarding each PMCH may include a position of an MBSFN subframe in which a corresponding PMCH is located, modulation and coding scheme (MCS) level information used for data transmission in a corresponding subframe, MBMS service information transmitted by the corresponding PMCH, or the like.

The UE receives MCH data through the MTCH on the basis of the PMCH. Scheduling on a time for the MCH data may be known through MCH scheduling information (MSI) delivered through the PMCH. The MSI contains information regarding how long corresponding MCH data transmission is continued.

Figure 6:
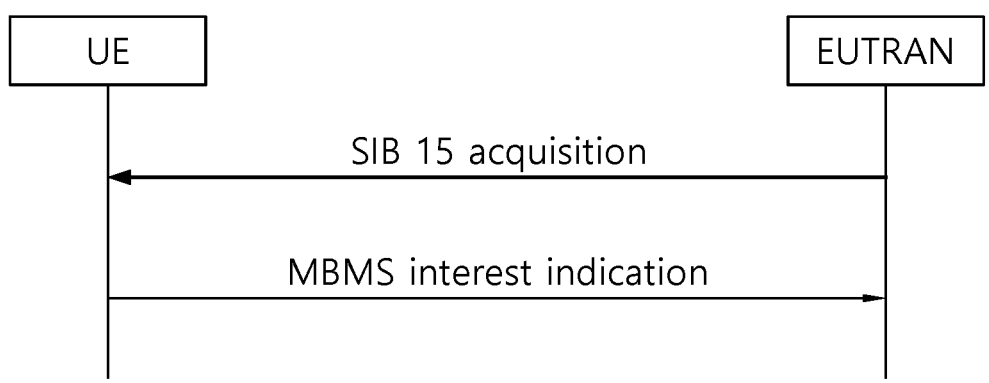
FIG. 6 shows an example of transmitting system information for an MBMS service and an MBMS interest indication message.

FIG. 6 shows an example of transmitting system information for an MBMS service and an MBMS interest indication message.

Referring to FIG. 6, the base station transmits a system information block 15 (SIB15) to the user equipment (or terminal). SIB15 corresponds to system information that is defined for an MBMS service. SIB15 may include MBMS service area identities (SAIs) of the current and/or neighboring carrier frequencies. Table 1 shown below represents an example of the SIB15.

In Table 1, the sai-IntraFreq field includes a list of MBMS service area identities of the carrier frequency to which the user equipment is currently accessing (or attached). The sai-InterFreqList field includes a list of neighboring frequencies providing an MBMS service and a corresponding list of MBMS service area identities. The sai-List field includes a list of MBMS service area identities for a specific frequency.

The user equipment, which is in a RRC connected state, transmits an MBMS interest indication message to the base station through an MBMS point to multipoint radio bearer (MRB). The user equipment may notify the frequency from which the user equipment is receiving an MBMS service, or the frequency providing the MBMS service, which the user equipment is interested in receiving (hereinafter referred to as an MBMS service of interest), to the base station through the MBMS interest indication message. The user equipment may also notify the frequency from which the user equipment is no longer receiving an MBMS service, or the frequency providing the MBMS service, which the user equipment is no longer interested in receiving (hereinafter referred to as an MBMS service of no interest), to the base station through the MBMS interest indication message. Additionally, the user equipment may notify whether or not it prioritizes the reception of the MBMS service over a unicast reception through the MBMS interest indication message. The MBMS interest indication message may be transmitted through a dedicated control channel (DCCH). A signaling radio bearer (SRB) for the MBMS interest indication message corresponds to SRB1, and the MBMS interest indication message may be transmitted based on a verification mode. Table 2 shown below represents an example of the MBMS interest indication message.

TABLE 2

ASN1START
MBMSInterestIndication-r11 ::= SEQUENCE {
criticalExtensions CHOICE {
c1 CHOICE {
interestIndication-r11 MBMSInterestIndication-r11-IEs,
spare3 NULL, spare2 NULL, spare1 NULL
},
criticalExtensionsFuture SEQUENCE { }
}
}
MBMSInterestIndication-r11-IEs ::= SEQUENCE {
mbms-FreqList-r11 CarrierFreqListMBMS-r11 OPTIONAL,
mbms-Priority-r11 ENUMERATED {true} OPTIONAL,
lateNonCriticalExtension OCTET STRING OPTIONAL,
nonCriticalExtension SEQUENCE { } OPTIONAL

TABLE 1

ASN1START
SystemInformationBlockType15-r11 ::= SEQUENCE {
sai-IntraFreq-r11 MBMS-SAI-List-r11 OPTIONAL, -- Need OR
sai-InterFreqList-r11 MBMS-SAI-InterFreqList-r11 OPTIONAL, -- Need OR
lateNonCriticalExtension OCTET STRING OPTIONAL, -- Need OP
...
}
MBMS-SAI-List-r11 ::= SEQUENCE (SIZE (1..maxSAI-MBMS-r11)) OF MBMS-SAI-r11
MBMS-SAI-r11::= INTEGER (0..65535)
MBMS-SAI-InterFreqList-r11 ::= SEQUENCE (SIZE (1..maxFreq)) OF MBMS-SAI-InterFreq-r11
MBMS-SAI-InterFreq-r11 ::= SEQUENCE {
dl-CarrierFreq ARFCN-ValueEUTRA,
sai-List-r11 MBMS-SAI-List-r11,
...
}
-- ASN1STOP TABLE 2-continued

```
      }
-- ASN1STOP
```

In Table 2, the mbms-FreqList field indicates a list of frequencies from which the user equipment is receiving an MBMS service, or frequencies providing MBMS services, which the user equipment is interested in receiving (hereinafter referred to as MBMS services of interest). The mbms-Priority field indicates whether or not the user equipment prioritizes an MBMS service reception over a unicast reception. In case the user equipment prioritizes the reception of all frequencies providing the MBMS services over the reception of a unicast bearer, the value of the mbms-Priority field may be 'True'. If not, the mbms-Priority field may be omitted.

The base station, which has received the MBMS interest indication message, may be aware that the user equipment is interested in shifting (or relocating) to a cell that is operated by a frequency providing an MBMS service. The base station may handover the user equipment to a cell of a specific frequency, which provides a specific MBMS service, and, after the handover of the user equipment, the base station allows the user equipment to be capable of easily receiving the MBMS service. Additionally, in case the user equipment is handed over from a first base station to a second base station, the first base station may deliver the MBMS interest indication message, which is received from the user equipment, to the second base station through an MBMS UE context. More specifically, the user equipment is not required to transmit the MBMS interest indication message one more time to the second base station. Even after the user equipment is handed over to the second base station, the second base station may allow the user equipment to be capable of continuously receiving the MBMS service easily.

Hereinafter, a Single-Cell Point-to-Multipoint (SCPTM) Transmission Will be Described in Detail.

The method for transmitting an MBMS service includes an SCPTM transmission and a Multimedia Broadcast multicast service Single Frequency Network (MBSFN) transmission. The MBSFN transmission transmits a signal that can be simultaneously identified by a plurality of cells, whereas the SCPTM transmission transmits an MBMS service from a single cell. Therefore, unlike the MBSFN transmission, inter-cell synchronization is not required in the SCPTM transmission. Additionally, unlike the MBSFN transmission, since the SCPTM transmission uses the conventional PDSCH without any modification, the SCPTM transmission has the characteristics of a unicast. More specifically, a plurality of user equipments reads the same PDCCH and acquires an RNTI for each service, so as to receive the SCPTM service. An SCPTM-dedicated MCCH was adopted, and, when the user equipment determines that the service it wishes to receive corresponds to an SCPTM service through the MCCH, the user equipment acquires the corresponding RNTI value. And, by reading the PDCCH through the corresponding RNTI, the user equipment may receive the SCPTM service.

A UE may report a TMGI of an MBMS service of interest, to an eNB via an MBMS interest indication message. The UE may initiate an MBMS interest indication procedure upon entering an MBMS service area, upon leaving the MBMS service area, upon session start or stop, upon change of the MBMS service of interest, upon change of a priority between MBMS reception and unicast reception. That is, the MBMS interest indication message may be transmitted. Therefore, for example, the MBMS interest indication message is not transmitted if there is no change in an MBMS frequency of interest and an MBMS service of interest and if there is a change in a service area for the MBMS service of interest. However, the UE does not report the MBMS interest indication message when the service area of interest changes in accordance with current specification. However, the MBMS interest indication message may need to be transmitted even though the service area for the MBMS service of interest changes. Therefore, there is a need to propose a method of determining an MBMS service of interest by the UE. In addition, there is a need to provide a method of transmitting the MBMS interest indication message by the UE when the service area changes.

Hereinafter, a method of determining an MBMS service of interest by a UE will be described according to an embodiment of the present invention.

Figure 7:
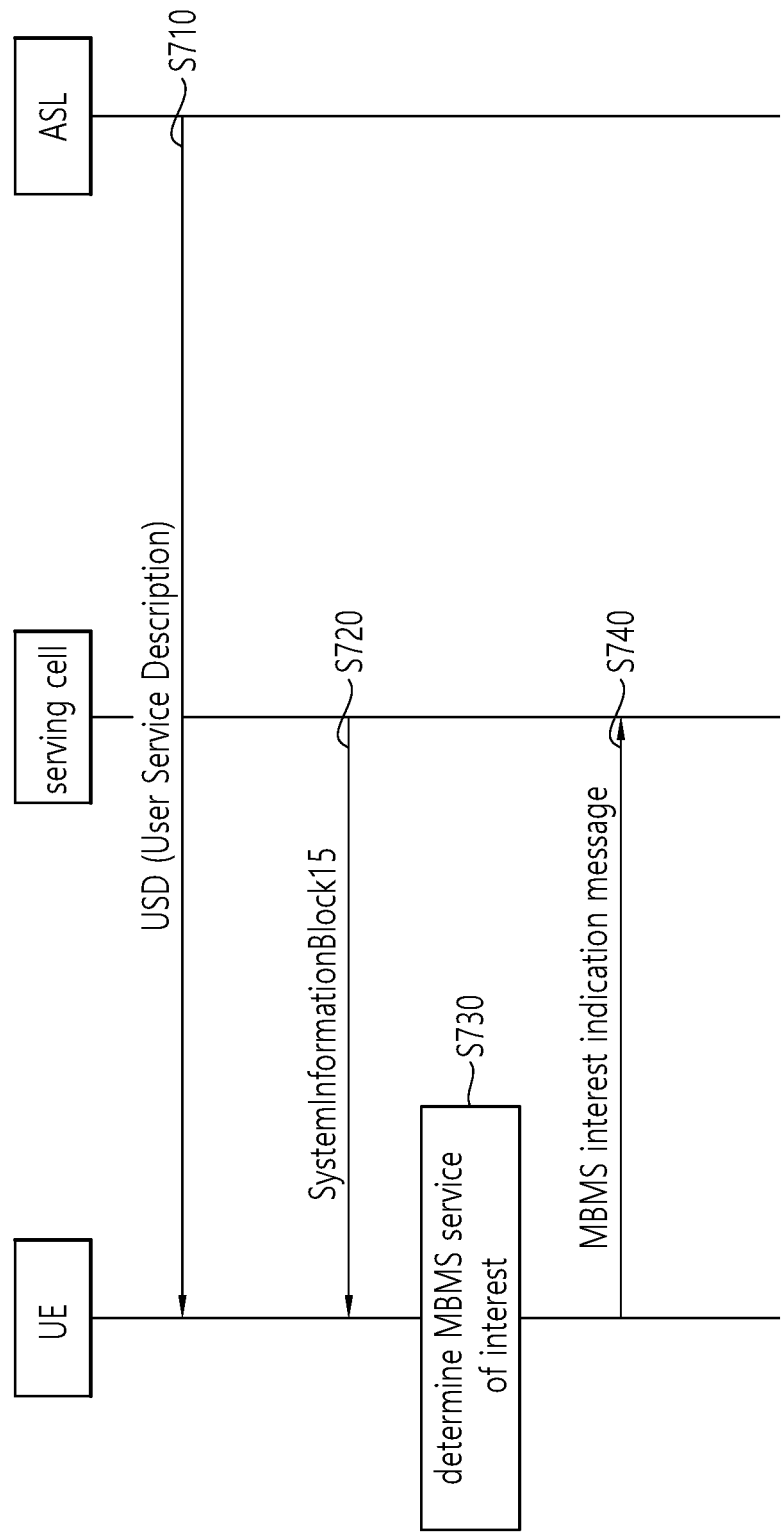
FIG. 7 shows a method of determining an MBMS service of interest by a UE according to an embodiment of the present invention.

FIG. 7 shows a method of determining an MBMS service of interest by a UE according to an embodiment of the present invention.

Referring to FIG. 7, in step S710, the UE may receive a user service description (USD). The USD may be received from an application/service layer (ASL). The USD may include a temporary mobile group identity (TMGI) for each MBMS service, a time and frequency for starting and ending a session, information of service area identities (SAIs) belonging to an MBMS service area, or the like.

In step S720, the UE may receive a SystemInformationBlock15 (SIB15). The SIB15 may be broadcast by a PCell. The SIB15 may include an MBMS SAI list. For example, the SIB15 may include an MBMS SAI list of a carrier frequency to which the UE has currently access. For example, the SIB15 may include a neighboring frequency list for providing the MBMS service and an MBMS service SAI list corresponding thereto. For example, the SIB15 may include an MBMS SAI list for a specific frequency.

In step S730, the UE may determine MBMS services of interest. If one or more MBMS SAIs in the USD for an MBMS service is included in SystemInformationBlockType15 acquired from the PCell, the UE shall consider the MBMS service to be part of the MBMS services of interest. If SystemInformationBlockType15 acquired from the PCell includes the MBMS SAI as indicated in the USD for MBMS session, the UE considers an MBMS service to be part of the MBMS services of interest. The MBMS service may be provided at a frequency belonging to a set of MBMS frequencies of interest. The UE may be an SCPTM capable UE. The UE may be receiving the MBMS service via an SC-MRB. Alternatively, the UE may be interested in receiving the MBMS service via the SC-MRB. One session of the MBMS service may be ongoing. Alternatively, one session of the MBMS service may be about to start.

In step S740, the UE may transmit an MBMS interest indication message. If a set of the MBMS services of interest, determined in step S730, is different from MBMS-Services included in last transmission of the MBMS interest indication message, the MBMS interest indication message may be transmitted. That is, if the set of MBMS services of interest changes after last transmission of the MBMS interest indication message, the UE may initiate transmission of the MBMS interest indication message. The MBMS interest indication message may be transmitted to a serving cell. The MBMS interest indication message may include the set of MBMS services of interest, determined in step S730. That is, the MBMS-services included in the MBMS interest indication message transmitted in step S740 may be set to the set of MBMS services of interest, determined in step S730.

Hereinafter, a method of transmitting an MBMS interest indication message by a UE upon change of a service area will be described according to an embodiment of the present invention.

Figure 8:
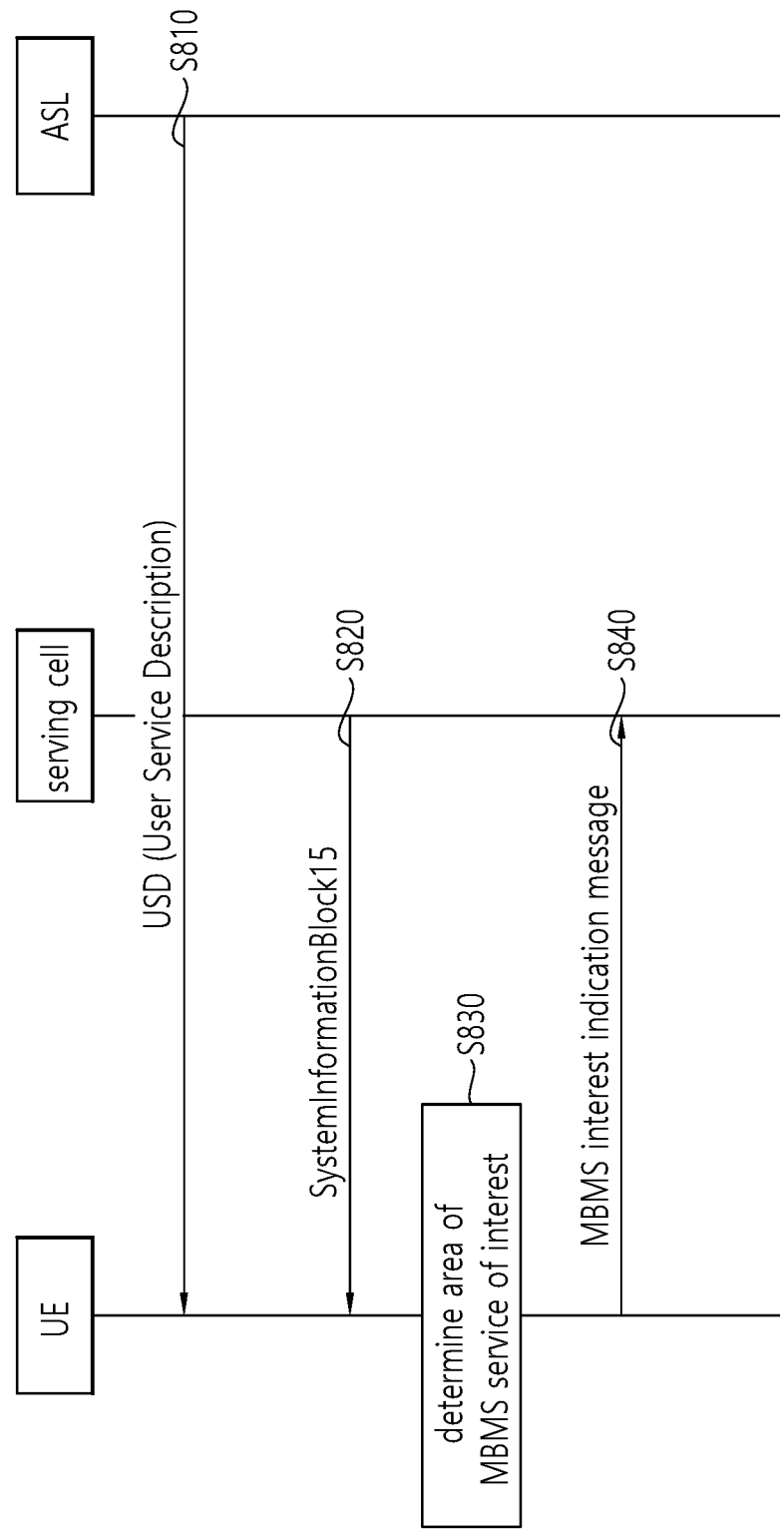
FIG. 8 shows a method of determining an area of an MBMS service of interest by a UE according to an embodiment of the present invention.

FIG. 8 shows a method of determining an area of an MBMS service of interest by a UE according to an embodiment of the present invention.

Referring to FIG. 8, in step S810, the UE may receive a USD. The USD may be received from an application/service layer. The USD may include a temporary mobile group identity (TMGI) for each MBMS service, a time and frequency for starting and ending a session, information of service area identities (SAIs) belonging to an MBMS service area, or the like.

In step S820, the UE may receive a SystemInformationBlock15 (SIB15). The SIB15 may be broadcast by a PCell. The SIB15 may include an MBMS SAI list. For example, the SIB15 may include an MBMS SAI list of a carrier frequency to which the UE has currently access. For example, the SIB15 may include a neighboring frequency list for providing the MBMS service and an MBMS service SAI list corresponding thereto. For example, the SIB15 may include an MBMS SAI list for a specific frequency.

In step S830, the UE may determine MBMS services of interest. The UE shall consider an MBMS service area to be part of an area of the MBMS services of interest, if the following conditions are met:
 at least one MBMS session the UE is receiving or interested to receive via an (SC-) MRB is on-going or about to start; and
 for at least one of these MBMS sessions SystemInformationBlockType15 acquired from the PCell includes the concerned SAI as indicated in the USD for this session.

In step S840, the UE may transmit the MBMS interest indication message. If the set of MBMS services of interest changes after last transmission of the MBMS interest indication message, the UE may initiate transmission of the MBMS interest indication message.

Figure 9:
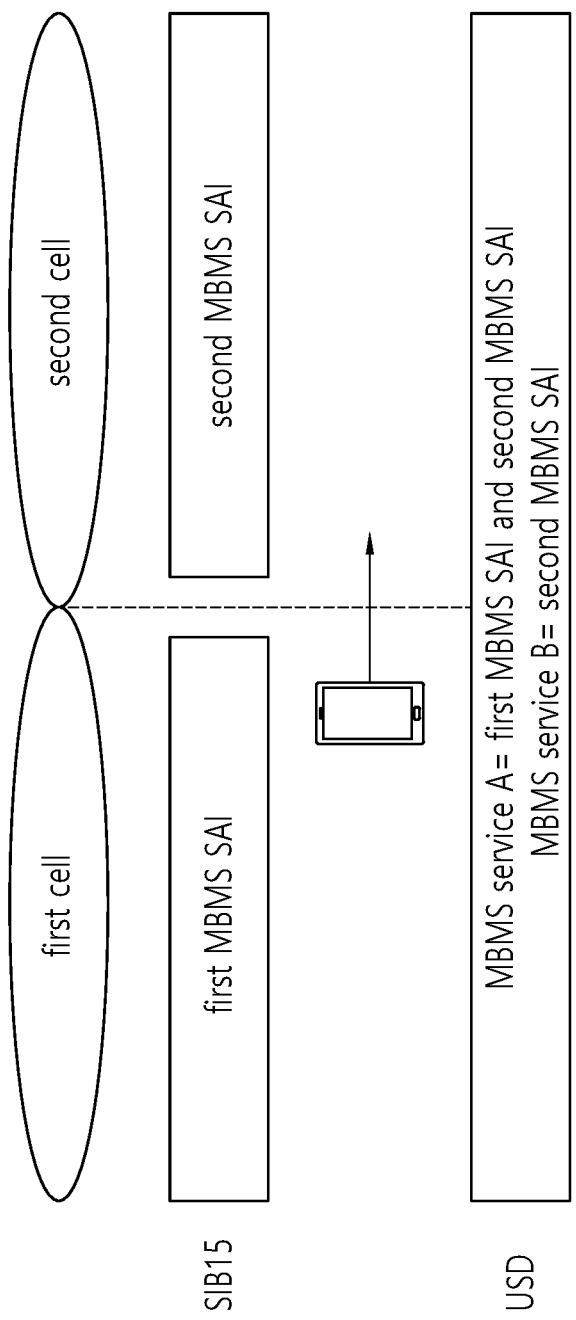
FIG. 9 is a drawing for explaining a procedure in which a UE determines an MBMS service of interest or an MBMS service area of interest, and transmits an MBMS interest indication message according to an embodiment of the present invention.

FIG. 9 is a drawing for explaining a procedure in which a UE determines an MBMS service of interest or an MBMS service area of interest, and transmits an MBMS interest indication message according to an embodiment of the present invention.

Referring to FIG. 9, a first MBMS service area and a second MBMS service area may exist on the same frequency layer. An MBMS service A may be provided in the first MBMS service area. The MBMS service A and an MBMS service B may be provided in the second MBMS service area. The first MBMS service area may be indicated by a first MBMS SAI. The second MBMS service area may be indicated by a second MBMS SAI. It is assumed that the UE is interested in the MBMS service A and the MBMS service B. The UE may receive a USD. On the basis of the USD, the UE may know that the MBMS service A is provided in the first MBMS service area and the second MBMS service area, and the MBMS service B is provided in the second MBMS service area.

(1) First, referring to FIG. 9, it is described a procedure in which the UE determines the MBMS service of interest, and transmits the MBMS interest indication message.

1) It is assumed that the UE currently exists within coverage of a cell 1. Therefore, the UE may receive an SIB15 from the cell 1. The SIB15 may include the first MBMS SAI. Therefore, it may be known that the UE is currently located in the first MBMS service area.

If one or more MBMS SAIs in the USD for an MBMS service is included in the SIB15 acquired from the cell 1, the UE shall consider the MBMS service to be the MBMS services of interest. Between the first MBMS SAI and the second MBMS SAI for the MBMS service A, since the first MBMS SAI is included in the SIB15, the MBMS service A may be considered to be the MBMS service of interest. On the other hand, since the second MBMS SAI for the MBMS service B is not included in the SIB15, the MBMS service B may not be considered to be the MBMS service of interest. Thereafter, the UE may transmit the MBMS interest indication message including information on the MBMS service A to the cell 1. Since the MBMS service B is provided only from the second MBMS service area and the SIB15 received from the cell 1 does not include the second MBMS SAI, information on the MBMS service B may not be included in the MBMS interest indication message.

2) Thereafter, it is assumed that the UE is handed over to a cell 2. Therefore, the UE may receive an SIB15 from the cell 2. The SIB15 may include the second MBMS SAI. Therefore, it may be known that the UE is currently located in the second MBMS service area.

If one or more MBMS SAIs in the USD for an MBMS service is included in the SIB15 acquired from the cell 2, the UE shall consider the MBMS service to be the MBMS services of interest. Between the first MBMS SAI and the second MBMS SAI for the MBMS service A, since the second MBMS SAI is included in the SIB15, the MBMS service B may be considered to be the MBMS service of interest. In addition, since the second MBMS SAI for the MBMS service B is included in the SIB15, the MBMS service B may be considered to be the MBMS service of interest. Since the MBMS service of interest changes, the UE may transmit the MBMS interest indication message including information on the MBMS service A and the MBMS service B to the cell 2.

(2) Next, referring to FIG. 9, it is described a procedure in which the UE determines the area of the MBMS service of interest, and transmits the MBMS interest indication message.

1) It is assumed that the UE currently exists within coverage of the cell 1. Therefore, the UE may receive an SIB15 from the cell 1. The SIB15 may include the first MBMS SAI. Therefore, it may be known that the UE is currently located in the first MBMS service area. Since the UE is interested in the MBMS service A and the MBMS service B, the UE may consider the first MBMS service area to be part of the area of the MBMS service of interest. Thereafter, the UE may transmit the MBMS interest indication message including information on the MBMS service A to the cell 1. Since the MBMS service B is provided only from the second MBMS service area and the SIB15 received from the cell 1 does not include the second MBMS SAI, information on the MBMS service B may not be included in the MBMS interest indication message.

2) Thereafter, it is assumed that the UE is handed over to the cell 2. Therefore, the UE may receive an SIB15 from the cell 2. The SIB15 may include the second MBMS SAI. Therefore, it may be known that the UE is currently located in the second MBMS service area. Since the UE is interested in the MBMS service A and the MBMS service B, the UE may consider the second MBMS service area to be part of the area of the MBMS service of interest. Therefore, even though the MBMS interest (i.e., MBMS frequency of interest and MBMS service of interest) does not change, the UE may transmit the MBMS interest indication message including the MBMS service A and the MBMS service B to the cell 2.

Figure 10:
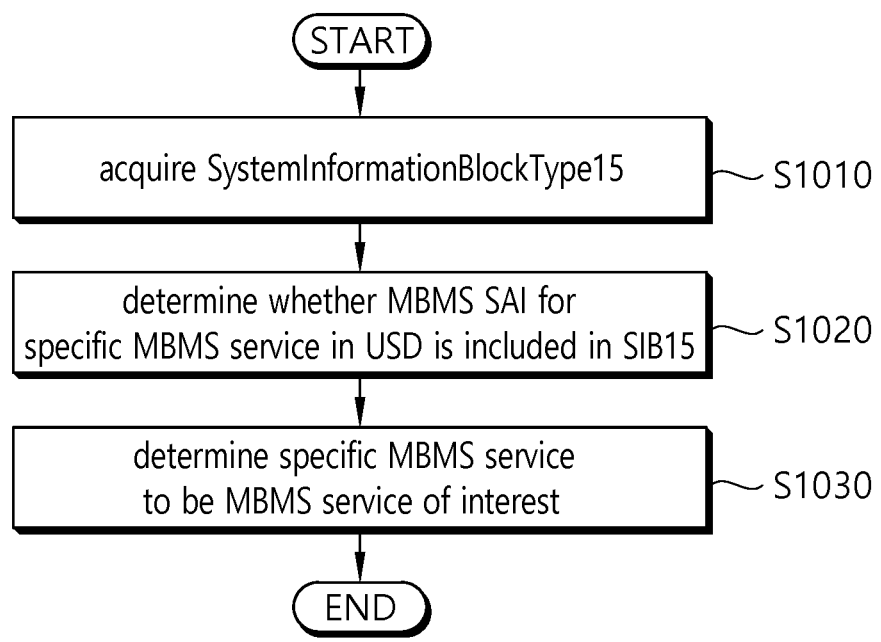
FIG. 10 is a block diagram illustrating a method of determining an MBMS service of interest by a UE according to an embodiment of the present invention.

FIG. 10 is a block diagram illustrating a method of determining an MBMS service of interest by a UE according to an embodiment of the present invention.

Referring to FIG. 10, in step S1010, the UE may acquire an SIB15. The SIB15 may be acquired from a primary cell (PCell). The PCell may be a serving cell. The SIB15 may include MBMS SAI. The UE may be receiving a specific MBMS service via a single cell (SC)-MBMS point to multipoint radio bearer (MRB). The UE may be interested in receiving the specific MBMS service via the SC-MRB.

In step S1020, the UE may check whether an MBMS service area identity (SAI) for the specific MBMS in a user service description (USD) is included in the SIB15. One or more MBMS SAIs may exist in the USD. A session of the specific MBMS service may be ongoing. The specific MBMS service may be provided at a frequency belonging to a set of MBMS frequencies of interest.

In step S1030, the UE may determine the specific MBMS service to be the MBMS service of interest. If MBMS SAI for the specific MBMS service in the USD is included in the SIB15, the specific MBMS service may be determined to be the MBMS service of interest.

The UE may check whether a set of the determined MBMS services of interest is different from MBMS-services included in last transmission of an MBMS interest indication message. If the set of the determined MBMS services of interest is different from the MBMS-services, the UE may initiate transmission of the MBMS interest indication message including the set of the determined MBMS services of interest.

Figure 11:
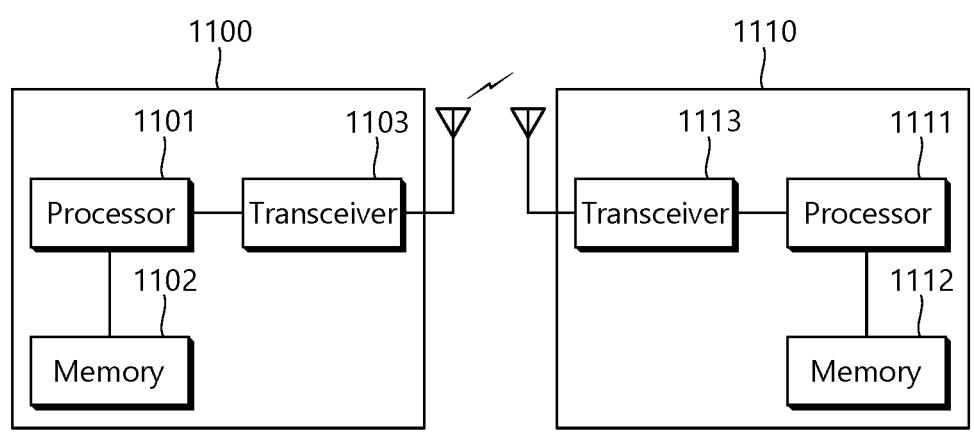
FIG. 11 is a block diagram illustrating a wireless communication system according to the embodiment of the present invention.

FIG. 11 is a block diagram illustrating a wireless communication system according to the embodiment of the present invention.

A BS 1100 includes a processor 1101, a memory 1102 and a transceiver 1103. The memory 1102 is connected to the processor 1101, and stores various information for driving the processor 1101. The transceiver 1103 is connected to the processor 1101, and transmits and/or receives radio signals. The processor 1101 implements proposed functions, processes and/or methods. In the above embodiment, an operation of the base station may be implemented by the processor 1101.

A UE 1110 includes a processor 1111, a memory 1112 and a transceiver 1113. The memory 1112 is connected to the processor 1111, and stores various information for driving the processor 1111. The transceiver 1113 is connected to the processor 1111, and transmits and/or receives radio signals. The processor 1111 implements proposed functions, processes and/or methods. In the above embodiment, an operation of the UE may be implemented by the processor 1111.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method performed by a user equipment (UE) in a wireless communication system, the method comprising:
transmitting a first multimedia broadcast/multicast service (MBMS) interest indication message including a first set of MBMS service of interest;
receiving a SystemInformationBlockType15 (SIB15) including MBMS service area identities (SAIs) of at least one of a current carrier frequency and neighboring carrier frequencies, wherein the SIB15 is acquired from a primary cell (PCell);
determining whether a MBMS SAI for a specific MBMS service included in a user service description (USD) is also included in the SIB15;
considering that a MBMS service related to the MBMS SAI is included in a second set of MBMS service of interest based on the determination that the MBMS SAI for the specific MBMS service in the USD is also included in the SIB15; and
initiating transmission of a second MBMS interest indication message including the second set of MBMS service of interest, based on that the second set of MBMS service of interest is different from the first set of MBMS service of interest,
wherein the UE is receiving or is interested in receiving the specific MBMS service via a single cell MBMS point to multipoint radio bearer (SC-MRB),
wherein the specific MBMS service is on-going or about to start,
wherein the first set of MBMS service of interest and the second set of MBMS service of interest respectively changes after a last transmission of the first MBMS interest indication message and the second MBMS interest indication message, and
wherein the second MBMS interest indication message is not transmitted if there is no change in an MBMS frequency of interest and an MBMS service of interest and if there is a change in a service area for the MBMS service of interest.

2. The method of claim 1, wherein the PCell is a serving cell.

3. The method of claim 1, wherein one or more MBMS SAIs exists in the USD.

4. The method of claim 1, wherein the SIB15 includes an MBMS SAI.

5. The method of claim 1, wherein the specific MBMS service is provided at a frequency belonging to a set of MBMS frequencies of interest.

6. A user equipment (UE) in a wireless communication system, the UE comprising:
- a memory;
- a transceiver; and
- a processor for coupling the memory and the transceiver, wherein the processor is configured to:
- control the transceiver to transmit a first multimedia broadcast/multicast service (MBMS) interest indication message including a first set of MBMS service of interest;
- control the transceiver to receive a SystemInformationBlockType15 (SIB15) including MBMS service area identities (SAIs) of at least one of a current carrier frequency and neighboring carrier frequencies, wherein the SIB15 is acquired from a primary cell (PCell);
- determine whether a MBMS SAI for a specific MBMS service included in a user service description (USD) is also included in the SIB15;
- consider that a MBMS service related to the MBMS SAI is included in a second set of MBMS service of interest based on the determination that the MBMS SAI for the specific MBMS service in the USD is also included in the SIB15; and
- control the transceiver to initiate transmission of a second MBMS interest indication message including the second set of MBMS service of interest, based on that the second set of MBMS service of interest is different from the first set of MBMS service of interest,
wherein the UE is receiving or is interested in receiving the specific MBMS service via a single cell MBMS point to multipoint radio bearer (SC-MRB),
wherein the specific MBMS service is on-going or about to start,
wherein the first set of MBMS service of interest and the second set of MBMS service of interest respectively changes after a last transmission of the first MBMS interest indication message and the second MBMS interest indication message, and
wherein the second MBMS interest indication message is not transmitted if there is no change in an MBMS frequency of interest and an MBMS service of interest and if there is a change in a service area for the MBMS service of interest.

* * * * *